United States Patent [19]

Click

[11] Patent Number: 5,085,543
[45] Date of Patent: Feb. 4, 1992

[54] HINGE/DOOR DRILL

[76] Inventor: William E. Click, 2465 Love Rd., Grand Island, N.Y. 14072

[21] Appl. No.: 674,106

[22] Filed: Mar. 25, 1991

[51] Int. Cl.⁵ .............................................. B23B 41/00
[52] U.S. Cl. ........................................ 408/48; 408/51; 408/53; 408/112
[58] Field of Search .................. 408/42, 48, 51, 53, 408/97, 110, 112

[56] References Cited

U.S. PATENT DOCUMENTS

| | | | |
|---|---|---|---|
| 629,294 | 7/1899 | Heady | 408/51 |
| 2,492,391 | 12/1949 | Minsk | 408/117 |
| 2,879,675 | 3/1959 | Morris | 408/53 |
| 3,499,353 | 3/1970 | Ewell | 408/53 |
| 4,061,437 | 12/1977 | Strange et al. | 408/53 |
| 4,917,549 | 4/1990 | Geernaert | 408/53 |

FOREIGN PATENT DOCUMENTS

| | | | |
|---|---|---|---|
| 810910 | 8/1951 | Fed. Rep. of Germany | 408/51 |
| 2846770 | 5/1980 | Fed. Rep. of Germany | 408/53 |

*Primary Examiner*—Daniel W. Howell
*Attorney, Agent, or Firm*—Wallace F. Neyerlin

[57] ABSTRACT

This hand tool is a portable tool, to be used on a construction site to drill pilot holes for the standard 4½" hinge used on doors in the majority of commercial buildings. It's light-weight, small and powered by any ⅜" drill motor. Base of tool is used to align the drills in place on the routed out section of door or jamb. The 4 hole configuration the tool has is a standard location used by the main door hinge manufacturers. The main advantage of the tool is the accuracy of the holes drilled. The labor time is cut by 75% over the old conventional way of drilling the holes in the hard wood one at a time for the accommodation of the screws that hold the hinge in place.

18 Claims, 4 Drawing Sheets

HINGE/DOOR DRILL

BACKGROUND OF THE INVENTION

1. Field of the Invention

This invention relates to a portable tool to generally be used on a construction site to drill pilot holes for the standard 4½ inch hinge used on doors in the majority of commercial buildings.

2. Description of Related Art

A search was conducted in the U.S. Patent Office in Class 408, sub-classes 1R, 42 and 117. The following patents were noted and selected as being the most pertinent to the tool or device of the present invention:

| Patentee | U.S. Pat. No. | Date | Title |
|---|---|---|---|
| A. Melniczak | 2,430,522 | 11/11/47 | Double Worker Drill, Reamer and Countersink |
| W. Minek | 2,492,391 | 12/27/49 | Multiple Spindle Head |
| J. D. Chailer | 3,833,311 | 9/3/74 | Wall Outlet and Switch Box Hole Cutter |
| D. D. Strange et al | 4,061,437 | 12/6/77 | Pilot Hole Borer |
| R. W. Geernaert | 4,917,549 | 4/17/90 | Boring Machine |

Aspects of each of these patents which fail to teach and/or accomplish the goals of the tool of the present invention may be summarized as follows:

U.S. Pat. No. 2,430,522

Not portable at all, but must be used in a shop or mill; Device arrangement is limited to drilling 3 holes in line; the Work must be brought to the location of the device.

U.S. Pat. No. 2,492,391

This tool is in a drill press and held in place from spinning around with a fixture. There is no handle for one person to hold and use it as a portable gang drill on a construction site. It is also gear driven with a 6 hole configuration and used strictly on cabinet doors. The work must be brought to the location of the device where it is held in place by a zig or a fixture.

U.S. Pat. No. 3,833,311

The device of this patent is not used for drilling holes. It is a saw or cutter accessory to be used with portable power tools and used to cut electric boxes in drywall and panelling.

U.S. Pat. No. 4,061,437

The device of this patent is not portable nor electrically driven but is a manually operable boring aparatus powered by compressed air drills; the 3 hole configuration bored by the device to be used on small cabinet doors; the cabinet door must be moved and put in exact location of fixture of the device to drill the pilot holes; the device is not suitable to be used on the construction site.

U.S. Pat. No. 4,917,549

The device is not portable; an air source is needed; use of the device is limited to drilling 2 holes in a parallel line; the device employs 2 air powered motors and requires a specific design; the device is used to drill 2 pilot holes in cabinet doors and is not suitable to be used on the construction site; the device is used and set up in a mill or shop.

None of the patents found in the search teach or suggest the novel portable tool taught by the present invention for use on a construction site to drill pilot holes for the standard 4½ inch hinge used on doors in the majority of commercial buildings.

SUMMARY OF THE INVENTION

The portable hand tool of the present invention works by drilling all 4 holes at one time for the standard 4½ inch hinge in wooden doors used in the majority of commercial buildings. It achieves this purpose by connecting a drill motor to it, starting the drill and drilling 4 holes at once. The tool has one drive shaft around which the drill chuck is tightened on the outside of the tool. It is light-weight, small and powered by any ⅜" drill motor. The base of the tool is designed so as to be used to align the 4 drills of the tool in place on the routed out section of the door jamb. The 4 hole configuration or pattern that the tool drills out by its 4 drills is a standard location of the holes used by the main door hinge manufacturers. A main advantage of the tool is the precision of location of the holes drilled, thus minimizing operational errors and drilling of holes in undesired or inaccurate sites. Also, the labor time in drilling the holes, (even if no errors are made in the operation) is cut or reduced by 75% over the present conventional way of drilling the holes in the door jamb one at a time for the accommodation of the screws that hold the door hinge in place.

Broader aspects of the invention and devices within the scope of same will become clear from a further reading of the specification and claims and a consideration of the drawings.

BRIEF DESCRIPTION OF THE DRAWINGS

FIGS. 1a and 1b illustrate alternative design variations of the base plate of the device.

DETAILED DESCRIPTION OF THE DRAWINGS AND OF THE PREFERRED EMBODIMENTS

Figure 1:
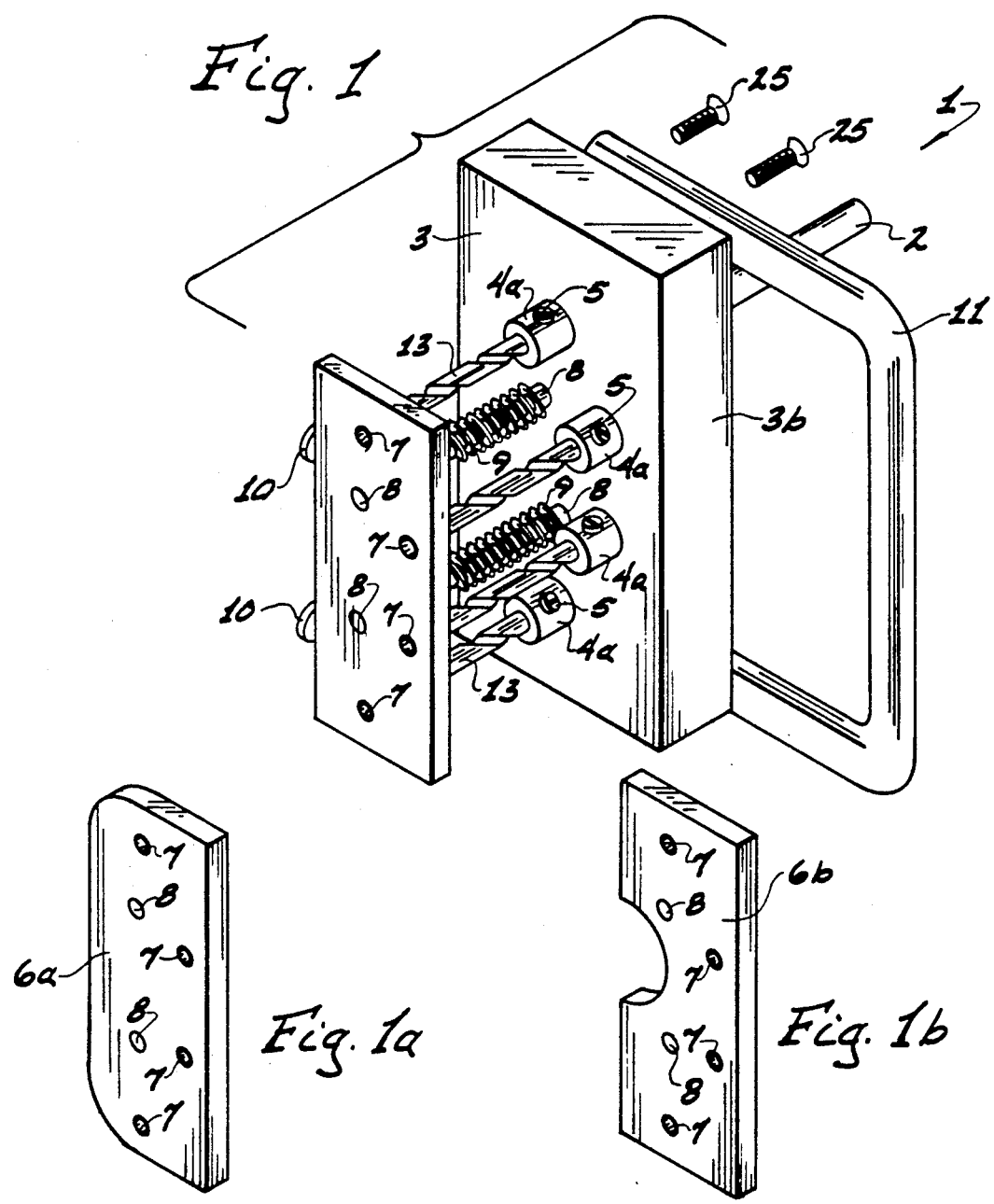
FIG. 1 is a perspective view of the tool of the present invention in its "relaxed" i.e. non-operating position.

In FIG. 1, the entire device is designated by the numeral 1. The interconnecting parts which cooperatively engage to drive the drills are encased in sprocket box 3. Power spindle or drive shaft 2 is for connection to the electric drill for powering the device. Sprocket box 3 will typically be encased in ⅛ inch thick aluminum plate 3b about its perimeter (typically two L-shaped members) and ¼ inch thick steel plate 3a at its top and bottom and have a length of about 5¼-5½ inches, a width of about 2⅜-3 inches and a thickness of about 1¼ inches, leaving a "working thickness" within the box of about ⅞" for the movable parts of the device. The distance from the outer end of the drive shaft 2 the outer side of base plate 6 will typically be about 5¾ to about 6 inches. Base plate 6 is typically 4½ inches long and 2¼ inches wide and 3/16 inches thick.

U-shaped Handle 11, preferably connected to the outer side of sprocket box 3, such as by means of 4 screws 25, will typically have legs about 3 to 4 inches long and is used for carrying the device as well as for aiding in exerting pressure against the sprocket box and springs when drilling holes.

Base plate 6 possesses four holes 7 oriented so as to align the four drills 13 of the device to drill holes in standard locations in the door jambs for the standard 4½ inch hinge of the wooden doors used in the majority of commercial buildings. Drills 13 are located in drill collars 4 between the sprocket box 3 and the base plate 6 and are tightened into place and/or periodically changed by means of set screws 5. Guide shafts or bolts 8 possesing heads 22, surrounded by springs 9 between sprocket box 3 and base plate 6 are threaded or welded into holes in the base plate and extend completely through to the outer side of the sprocket box.

Figure 2:
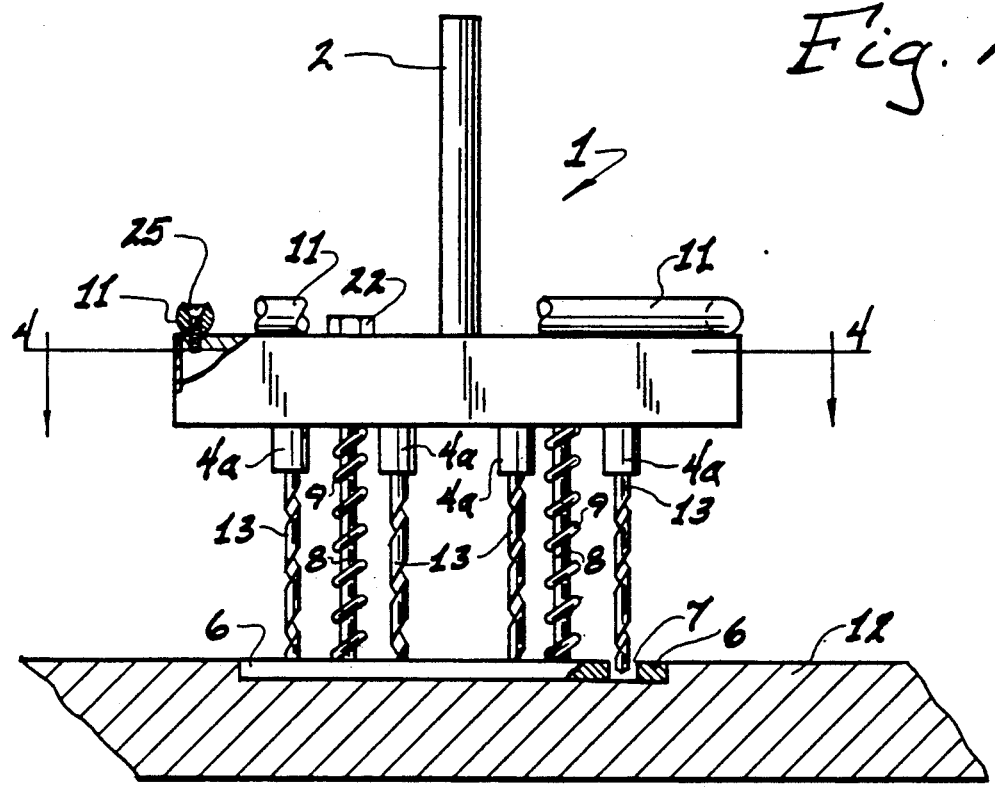
FIG. 2 is a side elevational view of the tool, also in its "relaxed" position.
Figure 3:
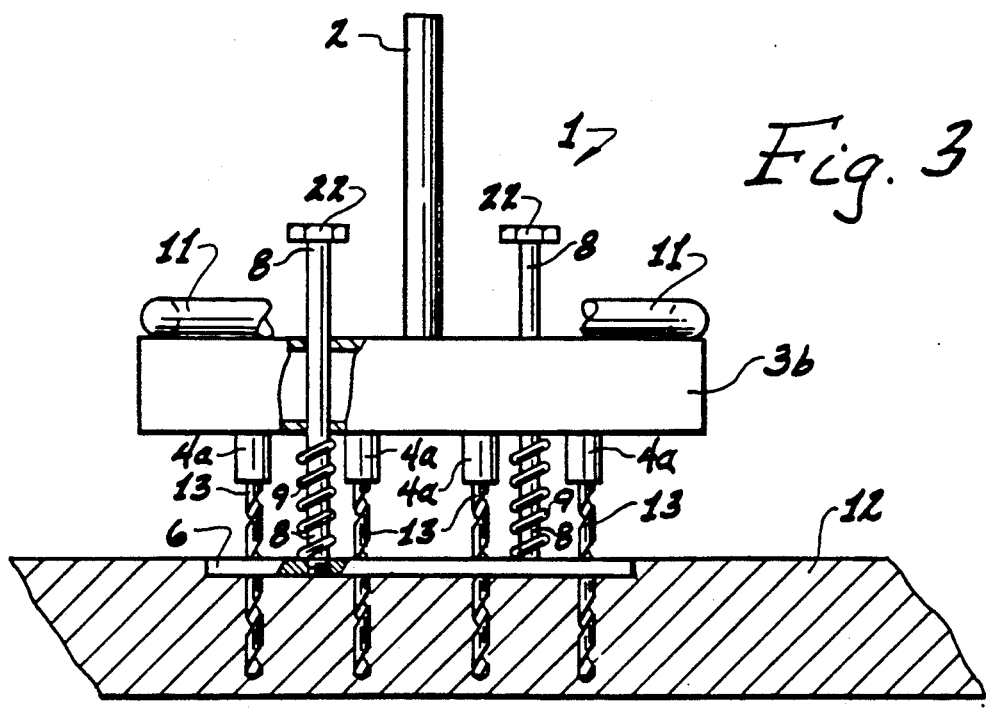
FIG. 3 is a side elevational view corresponding to that of FIG. 2, but showing the tool about in "mid-cycle" of drilling the 4 holes in the door jamb.

As shown in FIG. 2, when the device is in its relaxed (i.e. non-working position) the heads 22 of the bolts 8 abut the outer surface of plate 3a of the sprocket box. However, when in working position, i.e. when the drill is connected to shaft 2 and the plate 6 is inserted in place in the routed out section of the door jamb 12, as shown in FIG. 3, and when the user of the device turns the drill switch on and exerts pressure against the sprocket box, and its handle, the springs 9 are pressured and the ends of the drills 13 then extend beyond plate 6 and start drilling the 4 holes at the precisely desired locations in the door jambs.

To assure proper (not backwards or reverse) insertion of the base plate 6 in the routed out section of the door jamb 12, positioning lugs 10 may be welded to one edge of the base plate, as shown in FIG. 1; or alternatively, the edges which correspond to the edge having lugs 10 may be curved as shown in FIG. 1a; or be hollowed out slightly near its center as shown in FIG. 1b; or possess other suitable means to avoid the drilling of the holes in the wrong (i.e. opposite or backward) locations.

The twist drills 13 employed in the device are typically 13/64" and the holes 7 are only slightly larger in diameter so that the 4 holes when drilled in the door jamb are very precisely located in their desired locations.

The inner structural and working members within the sprocket box and/or gear box are now described by reference to FIGS. 4, 5 and 6.

In operation, the power drill chuck is tightened around power spindle or drive shaft 2. Sprocket 15 surrounds shaft 2 within the sprocket box. Roll pin 23, which is ⅛ inch in diameter and ⅝ inches long is friction fit through holes in shaft 2 and sprocket 15, as shown in FIG. 5 and holds the sprocket tightly to the drive shaft. Sprocket 15 has a commercial designation as 25B 12 and possesses 12 teeth. Sprockets 16 surrounding drill shafts 4 are the same as sprocket 15 and are also attached to shafts 4 by roll pins 23 in the same manner as sprocket 15 is held to drive shaft 2. (Shafts 4 end in drill collars 4a as previously mentioned).

Figure 4:
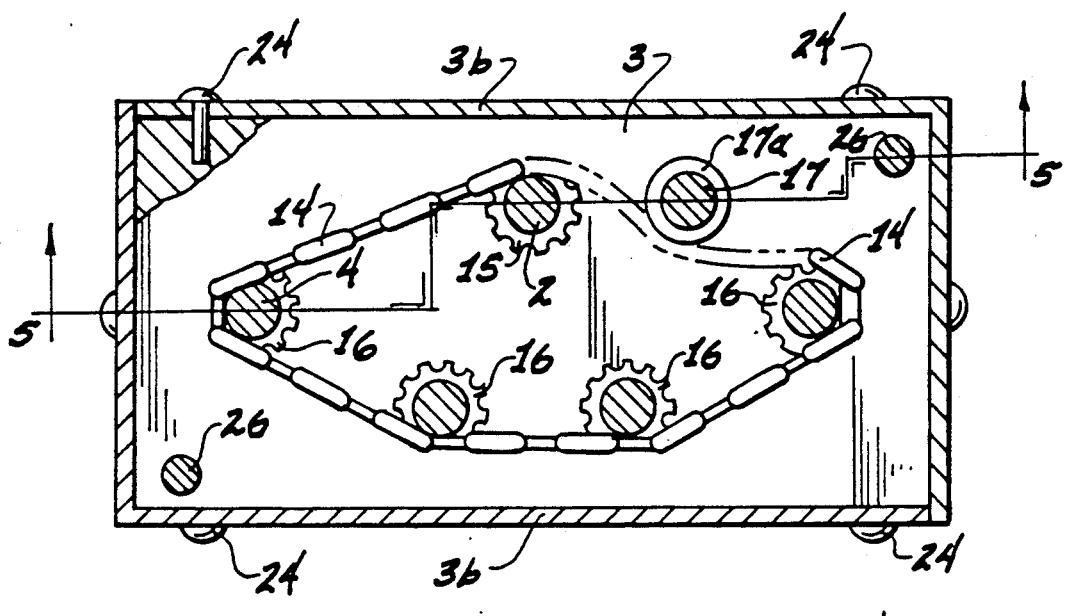
FIG. 4 is a horizontal cross-sectional view of the inner features of the tool, taken across the line 4—4 of FIG. 2; an FIG. 5 is a vertical cross-sectional view of the inner features of the tool, taken across the line 5—5 of FIG. 4.
Figure 5:
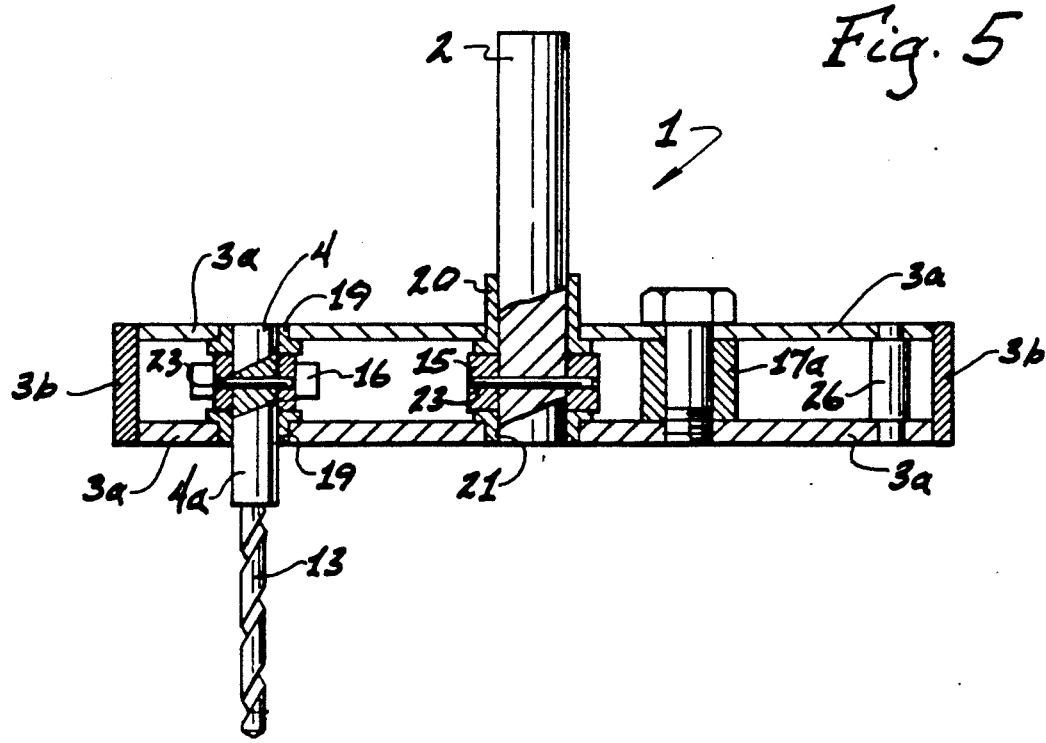

All of the sprockets are simultaneously driven or rotated by the drill by means of endless roller chain 14 which goes around each of the sprockets as illustrated in FIG. 4. Chain 14 is a roller chain such as manufactured by TSUBAKI under its designation "RS25" and typically has a length in the sprocket box of about 10¾ inches and is typically about ¼ inch wide over the teeth of the sprockets. One or more tension pins 17 surrounded by idler bushings 17a can be employed between top and bottom plates 3a of sprocket box 3 to assist in assuring desired chain tension so that the links of the chain and the teeth of the 5 sprockets properly coordinate without any snagging of the chain while the device is operated.

Bushings are and/or may be liberally employed in the construction of the multi-drill device in order to accomplish desired fit and spacing of the various parts. For example, drill shafts 4 are all surrounded by bushings 19 in the openings in top and bottom plates 3a. These typically are brass bushings which are press-fitted into plates 3a and which snugly surround the drill shafts. Similar bushings 20 and 21 also surround drive shaft 2 in the openings in top and bottom plates 3a. It should, of course, be realized that shafts 4 and drive shaft 2 are free to rotate within these bushings although surrounded by them.

Rivets or screws 24 are employed for fastening the L-shaped aluminum sheet members 3b to the sprocket box; and screws 25 are employed to fasten the handle to steel plate 3a of the sprocket box.

Two or more bolts 26 (¼ inch in diameter) are employed as spacers at diagonally opposite corners of the sprocket box between the top and bottom steel plates to provide good rigid firmness for the sprocket box and the members within same during the operation of the device.

Figure 6:
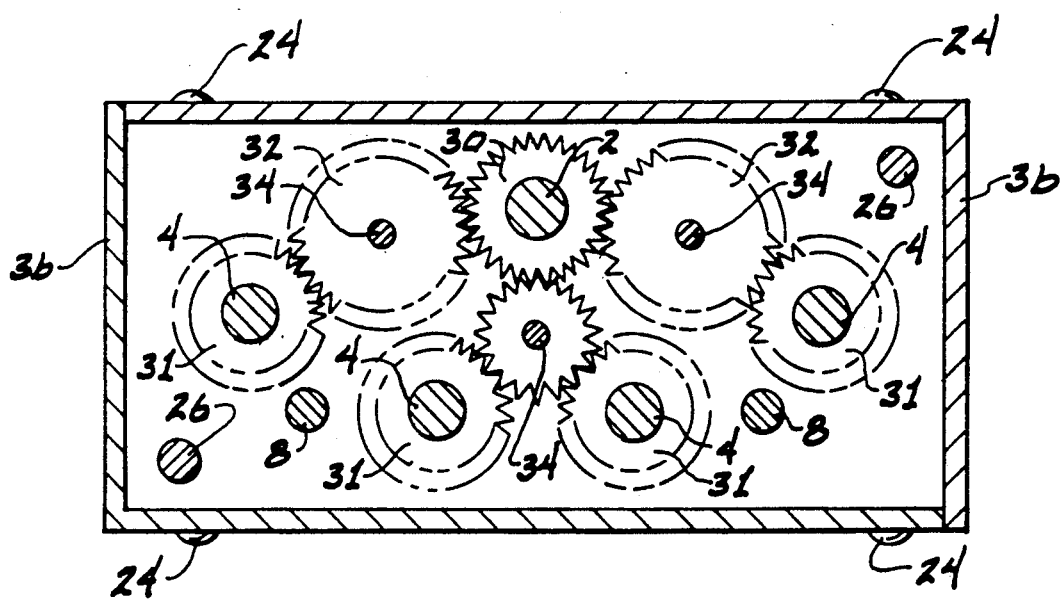
FIG. 6 is a horizontal cross-sectional view of the inner features of a variation of the tool wherein a gear box is employed, rather than a sprocket box, and the drills are gear driven rather than sprocket-chain driven.

In the device variation of FIG. 6, drive spindle 2 is surrounded by drive gear 30 and the four drill shafts 4 are surrounded by drill gears 31. Rotation of these shafts in the desired direction (and of drills 13 in the drill collars 4a of said shafts 4) is accomplished by means of large idler gears 32 and small idler gear 33 which are directly driven by drive gear 30. These gears are all supported by axle pins 34.

While the device has been described in connection with its preferred purpose of drilling all 4 holes at one time for the standard 4½ inch hinge in wooden doors used in the majority of commercial buildings, it should be recognized that modifications of the tool within the scope and intent of the invention may be mede wherein the purpose of the tool is not so circumscribed and limited.

As is noted from the foregoing detailed description of the device of the present invetion of its preferred embodiment, it works by drilling 4 holes at once in wooden doors for the typical commercial building. It takes only one-fourth the time over the conventional method of drilling holes and achieves its purpose by connecting it to the chuck of a conventional drill motor. It not only saves time but also assures precise and accurate holemaking exactly where desired. The device is appealing to construction companies because it saves time and labor costs of hanging a door.

It will be appreciated that the foregoing specification and the accompanying drawings are set forth by way of illustration and not limitation, and that various modifications and changes may be made therein without departing from the spirit and scope of the present invention which is to be limited solely by the scope of the appended claims.

I claim:

1. A portable hand tool to drill pilot holes for the standard 4½ inch hinge used on doors, said hand tool being capable of being powered and driven by a standard hand-operated electric drill and comprising the following elements:
   A. a power spindle drive shaft for being connected to the electric drill;
   B. an enclosed sprocket box, said box containing five sprockets surrounded by an endless chain, one of which sprockets surrounds a portion of the drive shaft within the sprocket box, and the other four of which sprockets surround portions of drill shafts located within the sprocket box;
   C. four drill collars outside the sprocket box, on the side of the sprocket box opposite the side from the side where the drive shaft enters the sprocket box, said drill collars being extensions of or mechanically coupled to the drill shafts located within the sprocket box and said collars being capable of receiving drills within same and possessing means for tightening the drills within the collars;
   D. a handle for the hand tool connected to the sprocket box;
   E. the aforesaid opposite sides of the sprocket box being rigid structural members of the box and being rigidly spaced and separated within the box by at least two diagonally opposite spacing members near corners of the box;
   F. a base plate distant from the sprocket box opposite the side of the sprocket box containing the drill collars, said base plate being kept distant from and parallel to the sprocket box by means of springs surrounding guide shafts, the ends of the springs being located between the base plate and the sprocket box and pushing against the facing surfaces of each, one end of each guide shaft being threaded or welded into openings in the base plate and the opposite end of each guide shaft terminating in heads on the side of the sprocket box where the drive shaft enters; and
   G. said base plate possessing four holes in same for the drilling of pilot holes for the standard 4½ inch hinge used on doors in the majority of commercial buildings.

2. A portable hand tool according to claim 1 wherein the sprockets are each the same and each possesses 12 teeth.

3. A portable hand tool according to claim 1 wherein the base plate possesses means for enabling the user to know he will be correctly inserting it in the routed out section of the door jamb.

4. A portable hand tool according to claim 1 wherein the working area within the sprocket box measures approximately 5¼ inches long, 2¾ inches wide and ¾ inch thick.

5. A portable hand tool according to claim 1 wherein the handle is connected to the same side of the sprocket box where the drive shaft enters the box.

6. A portable hand tool according to claim 1 when employing two guide shafts in its construction, each surrounded by springs.

7. A portable hand tool to drill a multiplicity of pilot holes, said hand tool being capable of being powered and driven by a standard hand-operated electric drill and comprising the following elements:
   A. a power spindle drive shaft for being connected to the electric drill;
   B. an enclosed sprocket box, said box containing several sprockets surrounded by an endless chain, one of which sprockets surrounds a portion of the drive shaft within the sprocket box, and the others of which surround portions of drill shafts located within the sprocket box;
   C. drill collars outside the sprocket box, on the side of the sprocket box opposite the side from the side where the drive shaft enters the sprocket box, said drill collars being extensions of or mechanically coupled to the drill shafts located within the sprocket box and said collars being capable of receiving drills within same and possessing means for tightening the drills within the collars;
   D. a handle for the hand tool connected to the sprocket box;
   E. the aforesaid opposite sides of the sprocket box being rigid structural members of the box and being rigidly spaced and separated within the box by at least two diagonally opposite spacing members near corners of the box;
   F. a base plate distant from the sprocket box opposite the side of the sprocket box containing the drill collars, said base plate being kept distant from and parallel to the sprocket box by means of springs surrounding guide shafts, the ends of the springs being located between the base plate and the sprocket box and pushing against the facing surfaces of each, one end of each guide shaft being threaded or welded into openings in the base plate and the opposite end of each guide shaft terminating in heads on the side of the sprocket box where the drive shaft enters; and
   G. said base plate possessing holes in same for the drilling of pilot holes for the insertion of screws where desired in the object in which the holes are drilled.

8. A portable hand tool according to claim 7 wherein the sprockets are each the same and each possesses 12 teeth.

9. A portable hand tool according to claim 7 wherein the base plate possesses means for enabling the user to know he will be correctly aligning it in or on the object in which the holes are drilled.

10. A portable hand tool according to claim 7 wherein the working area within the sprocket box measures approximately 5¼ inches long, 2¾ inches wide and ¾ inch thick.

11. A portable hand tool to drill a multiplicity of pilot holes, said hand tool being capable of being powered and driven by a standard hand-operated electric drill and comprising the following elements:
   A. a power spindle drive shaft for being connected to the electric drill;
   B. an enclosed gear box, said box containing several interacting gears with hollow centers, one of which gears surrounds a portion of the drive shaft within the gear box, and the others of which surround portions of drill shafts located within the gear box;
   C. drill collars outside the gear box, on the side of the gear box opposite the side from the side where the drive shaft enters the gear box, said drill collars being extensions of or mechanically coupled to the drill shafts located within the gear box and said collars being capable of receiving drills within same and possessing means for tightening the drills within the collars;

D. a handle for the hand tool connected to the gear box;

E. the aforesaid opposite sides of the gear box being rigid structural members of the box and being rigidly spaced and separated within the box by at least two diagonally opposite spacing members near corners of the box;

F. a base plate distant from the gear box opposite the side of the gear box containing the drill collars, said base plate being kept distant from and parallel to the gear box by means of springs surrounding guide shafts, the ends of the springs being located between the base plate and the gear box and pushing against the facing surfaces of each, one end of each guide shaft being threaded or welded into openings in the base plate and the opposite end of each guide shaft terminating in heads on the side of the gear box where the drive shaft enters; and G. said base plate possessing holes in same for the drilling of pilot holes for the insertion of screws where desired in the object in which the holes are drilled.

12. A portable hand tool according to claim 11 wherein the base plate possesses means for enabling the user to know he will be correctly aligning it in or on the object in which the holes are drilled.

13. A portable hand tool according to claim 11 wherein the working area within the gear box measures approximately 5½ inches long, 2¾ inches wide and ¾ inch thick.

14. A portable hand tool to drill pilot holes for the standard 4½ inch hinge used on doors, said hand tool being capable of being powered and driven by a standard hand-operated electric drill and comprising the following elements:

A. a power spindle drive shaft for being connected to the electric drill;

B. an enclosed gear box, said box containing five interacting gears with hollow centers, one of which gears surrounds a portion of the drive shaft within the gear box, and the other four of which gears surround portions of drill shafts located within the gear box;

C. four drill collars outside the gear box, on the side of the gear box opposite the side from the side where the drive shaft enters the gear box, said drill collars being extensions of or mechanically coupled to the drill shafts located within the gear box and said collars being capable of receiving drills within same and possessing means for tightening the drills within the collars;

D. a handle for the hand tool connected to the gear box;

E. the aforesaid opposite sides of the gear box being rigid structural members of the box and being rigidly spaced and separated within the box by at least two diagonally opposite spacing members near corners of the box;

F. a base plate distant from the gear box opposite the side of the gear box containing the drill collars, said base plate being kept distant from and parallel to the gear box by means of springs surrounding guide shafts, the ends of the springs being located between the base plate and the gear box and pushing against the facing surfaces of each, one end of each guide shaft being threaded or welded into openings in the base plate and the opposite end of each guide shaft terminating in heads on the side of the gear box where the drive shaft enters; and G. said base plate possessing four holes in same for the drilling of pilot holes for the standard 4½ inch hinge used on doors in the majority of commercial buildings.

15. A portable hand tool according to claim 14 wherein the base plate possesses means for enabling the user to know he will be correctly inserting it in the routed out section of the door jamb.

16. A portable hand tool according to claim 14 wherein the working area within the gear box measures approximately 5½ inches long, 2¾ inches wide and ¾ inch thick.

17. A portable hand tool according to claim 14 wherein the handle is connected to the same side of the gear box where the drive shaft enters the box.

18. A portable hand tool according to claim 14 when employing two guide shafts in its construction, each surrounded by springs.

* * * * *